Jan. 30, 1923.
E. J. MUCH.
FISHING TOOL.
FILED JAN. 11, 1922.
1,443,636
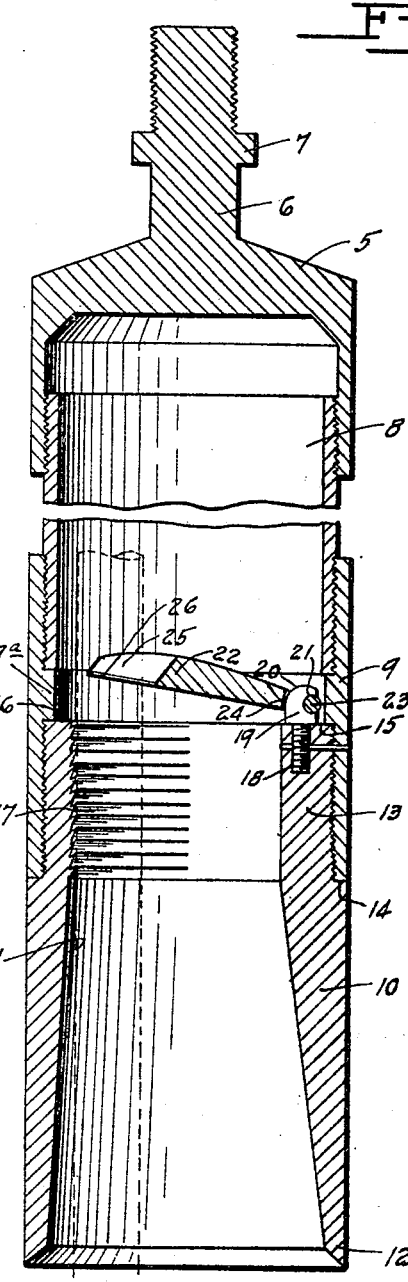
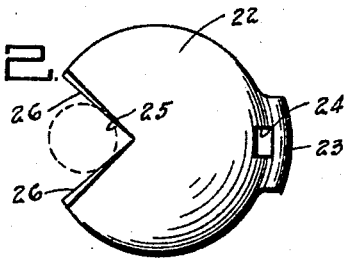
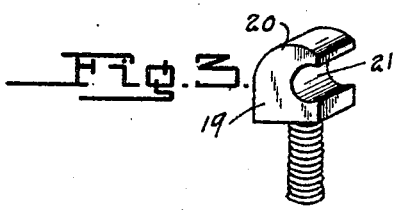
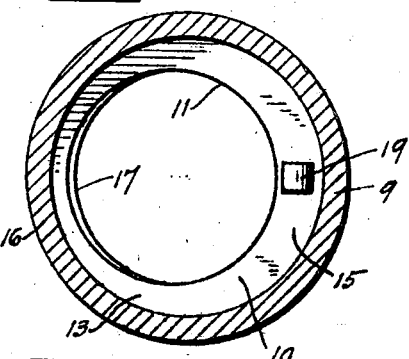
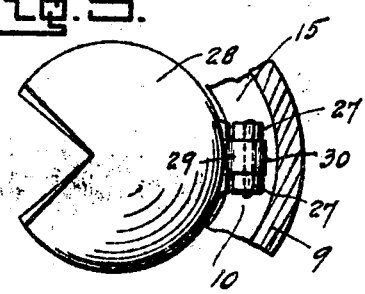
Inventor
Edward J. Much
By Watson E. Coleman
Attorney Patented Jan. 30, 1923.

1,443,636

UNITED STATES PATENT OFFICE.

EDWARD J. MUCH, OF FLORENCE, KANSAS.

FISHING TOOL.

Application filed January 11, 1922. Serial No. 528,383.

*To all whom it may concern:*

Be it known that I, EDWARD J. MUCH, a citizen of the United States, residing at Florence, in the county of Marion and State of Kansas, have invented certain new and useful Improvements in Fishing Tools, of which the following is a specification, reference being had to the accompanying drawings.

This invention relates to fishing tools for removing sucker rods and conduits from wells.

An object of the inventiton is to provide a tool of this character which is substantially automatic in attaching itself to a sucker rod to permit ready removal of the rod.

Another object of the invention is to provide a tool of this character having teeth disposed inwardly thereof and having a gravity operated jaw member adapted to urge the sucker rod toward and into engagement with the teeth.

It is also an object of the invention to provide a tool of this character having a movable jaw member adapted to practically embrace the member to be removed to cause penetration of said member by the teeth of the tool.

It is a further object of the invention to privide a tool of this character composed of a number of sections, each may be readily disassembled when necessary, one of said sections including a pivoted jaw member adapted to extend partially over said section, said jaw member being automatic in its operation to substantially jam the member to be removed into engagement with the teeth of the tool upon upward pull of the tool and resistance of the object to be removed.

With these and other objects in view, the invention consists in the improved construction and arrangement of parts to be hereinafter more particularly described, fully claimed and illustrated in the accompanying drawings, in which:—

Figure 1 is a longitudinal sectional view of a fishing tool constructed in accordance with an embodiment of the invention;

Figure 2 is a detailed view of the jaw member;

Figure 3 is a perspective view of the bearing member;

Figure 4 is a transverse sectional view of the structure shown in Figure 1, the jaw member being removed; and Figure 5 is a fragmentary plan view of another form of connecting the jaw member to the body member.

Referring to the drawings, 5 designates the cap or top section of the tool, the inner face and walls of the cap being threaded, while projecting from the top of the cap centrally thereof is a shank 6 having a collar 7, the portion of the shank above the collar being threaded for engagement with any suitable means to apply or remove the tool. The second section of the tool comprises a sleeve 8 which is exteriorly threaded, one end of said sleeve being disposed within the cap, while the opposite end is threaded for engagement with an internally threaded collar or coupling 9. The coupling 9 has an inwardly projecting annular protuberance 9$^a$, said protuberance being disposed at the central portion and inwardly of the coupling to provide a stop for the sleeve 8 and body member to be hereinafter described, to hold said braces in spaced relation to each other and prevent interference with the operation of the device. By this means, the length of the tool can be regulated so as to permit the end of the broken sucker rod to extend a considerable distance within the tool before the gripping operation takes place, to allow for a considerable amount of outward movement of the rod before the same is firmly secured within the tool.

In connection with the tool, a body member 10 is provided, said body member having an eccentric bore 11, or in other words, a longitudinal bore which is disposed nearer one side of the body member than the opposite side. The inner wall or face of the bore is substantially flared from a point adjacent the intermediate portion of the body member to the lower end 12 of the body member. The upper end 13 of the body member is annularly reduced to provide an annular shoulder 14, said reduced portion being exteriorly threaded for insertion in the lower end of the coupling 9, the end of said coupling being adapted to engage the shoulder 14. By the use of the eccentric bore, a relatively wide portion 15 and narrow portion 16 are provided.

A series of gripping teeth 17 are provided inwardly of the end portion 13 of the body member and adjacent the narrow portion 16 thereof, said teeth extending only half-way around the inner wall of the bore. The teeth 17 are also inclined toward the end 13 of the body member, or in other words upwardly, so that movement of an object within the body member, toward the end 12, when engaged with the teeth 17 will cause the teeth to penetrate said object.

The portion 15 of the body member is provided with a threaded opening 18 adapted to receive the threaded shank of a pin or bearing member 19, said shank including a head 20 which is rounded and provided with a recess 21 in one face thereof, said recess being substantially semi-circular and extending laterally of the head. A jaw member 22 is used, the jaw having a convex top to increase the weight of the jaw. The diameter of the jaw is less than the diameter of the bore 11. An extension or bearing member 23 projects from the edge of said disc, while a slot or opening 24 is provided in the extension 23, the slot being adapted to receive the head of the pin 19, while the portion of the pintle adjacent the slot is intended to enter the recess 21 of the pin. The portion of the disc diametrically opposite the pintle and slot is provided with a substantially V-shaped recess 25, the edges of said recess being sharpened to provide teeth 26 adapted to substantially cooperate with the teeth 17 of the body member.

In Figure 5, another form of connection for the disc to the body member is shown. This form consists of a pair of ears 27 which may be threaded into the body member or formed integral with said body member, the ears being provided with registering openings. The edges of the ears adjacent the bore are rounded so as to facilitate movement of the disc. The disc 28 in this form of the invention is provided with a projection or lug 29, the extremity of said lug being extended upwardly to provide a stop 30. The lug 29 is intended to be disposed between the ears, the pin being passed through the registering openings of the ears and the lug to pivotally connect the disc to said body member.

In the use of the device, the shank 6 is coupled to a rod and inserted in the well. The flared portion of the bore 11 permits the tool to guide the end of the broken sucker rod inwardly of the body member, the broken end of the rod passing beyond the end 13 of the body member and in through the sleeve 8, so as to allow for slipping when the tool is pulled upwardly. Also, upon inward movement of the broken sucker rod, the same comes in contact with the jaw member 22 and urges the same upwardly above the end 13 of the body member, the rod thereby entering the recess 25. Upon reverse or upward movement of the tool, the sucker rod will naturally resist, thereby urging the jaw member downwardly and substantially inwardly of the bore 11, causing the teeth 17, as well as the teeth 26 of the jaw member to bite into the surface of the sucker rod whereby upward movement of the tool may be continued to efficiently remove the broken sucker rod from the well.

From the foregoing it will be readily seen that this invention provides a novel form of tool for use in wells, to efficiently remove the sucker rod without loss of time and without inconvenience to the operator, the gripping operation of the sucker rod within the tool being automatic in view of the novel formation of the jaw members and the particular position of the teeth 17. In addition to this, in view of the various sections of the tool it may be readily removed and disassembled if necessary, and at the same time this feature permits lengthening of the tool to permit the broken end of the sucker rod to enter the tool a considerable distance before the movement of the tool is reversed, so as to prevent accidental disengagement of the rod from the tool.

What is claimed is:—

A fishing tool embodying a tubular body member having one end thereof reduced and exteriorly threaded, the end face of said reduced portion having a threaded opening, a bearing block having a threaded stem, said stem being adapted to extend into the opening, one face of the block having a bearing groove, a clamping plate having an extension, the outer edge of the extension being rounded, said extension having an opening for the reception of the bearing block, the groove of said bearing block being adapted to receive the rounded edge of the extension.

In testimony whereof I hereunto affix my signature.

EDWARD J. MUCH.